Patented Dec. 27, 1949

2,492,191

UNITED STATES PATENT OFFICE 2,492,191

21-BROMOPREGNENES

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,763

3 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone $\Delta 4,5$-3,11,20 - triketo - $17(\beta)$, 21 - dihydroxy pregnene. This application is a divisional of copending application Serial No. 605,194, filed July 14, 1945, now abandoned.

This hormone is known to occur naturally in the adrenal cortex; it has the structural formula:

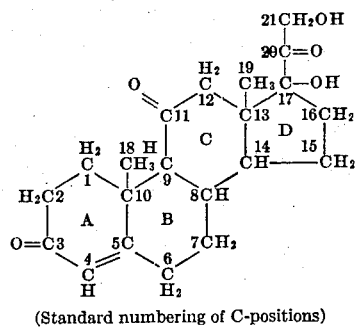

(Standard numbering of C-positions)

This formula, for purposes of convenience, is hereinafter reproduced below in the abbreviated form:

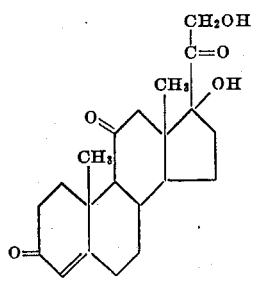

In the following description of the invention, the stereochemical relationships of substituents are indicated by the following conventions:

1. A substituent at the C-3 position which is trans to the C-10 methyl group is parenthetically designated $(\alpha)$.

2. A substituent at the C-17 position, the stereochemical configuration of which is identical with that of the naturally occurring adrenal hormones, is parenthetically designated $(\beta)$; the epimeric configuration is designated $(\alpha)$. In the structural formulae the former configuration is shown by writing the C-17 substituent (hydroxyl) to the right of the C-17 carbon side chain, thus

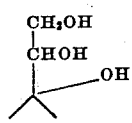

in the latter case above the side chain, thus

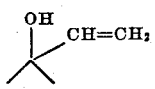

3. The stereochemical relationship of rings A and B is indicated in the formulae by a solid line representing the valence bond in the cis configuration.

In accordance with the present invention it is now found this hormone can be synthesized by reactions indicated as follows:

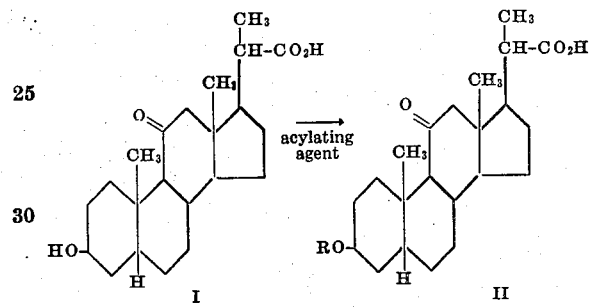

↓ acyl-halide-forming reagent

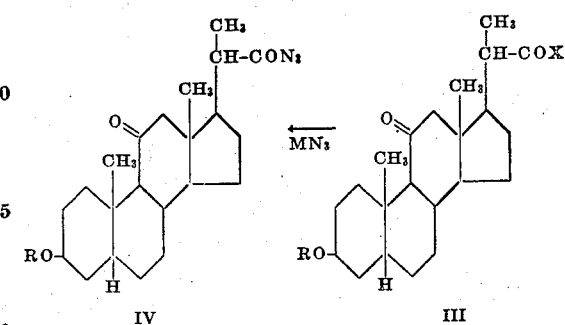

↓

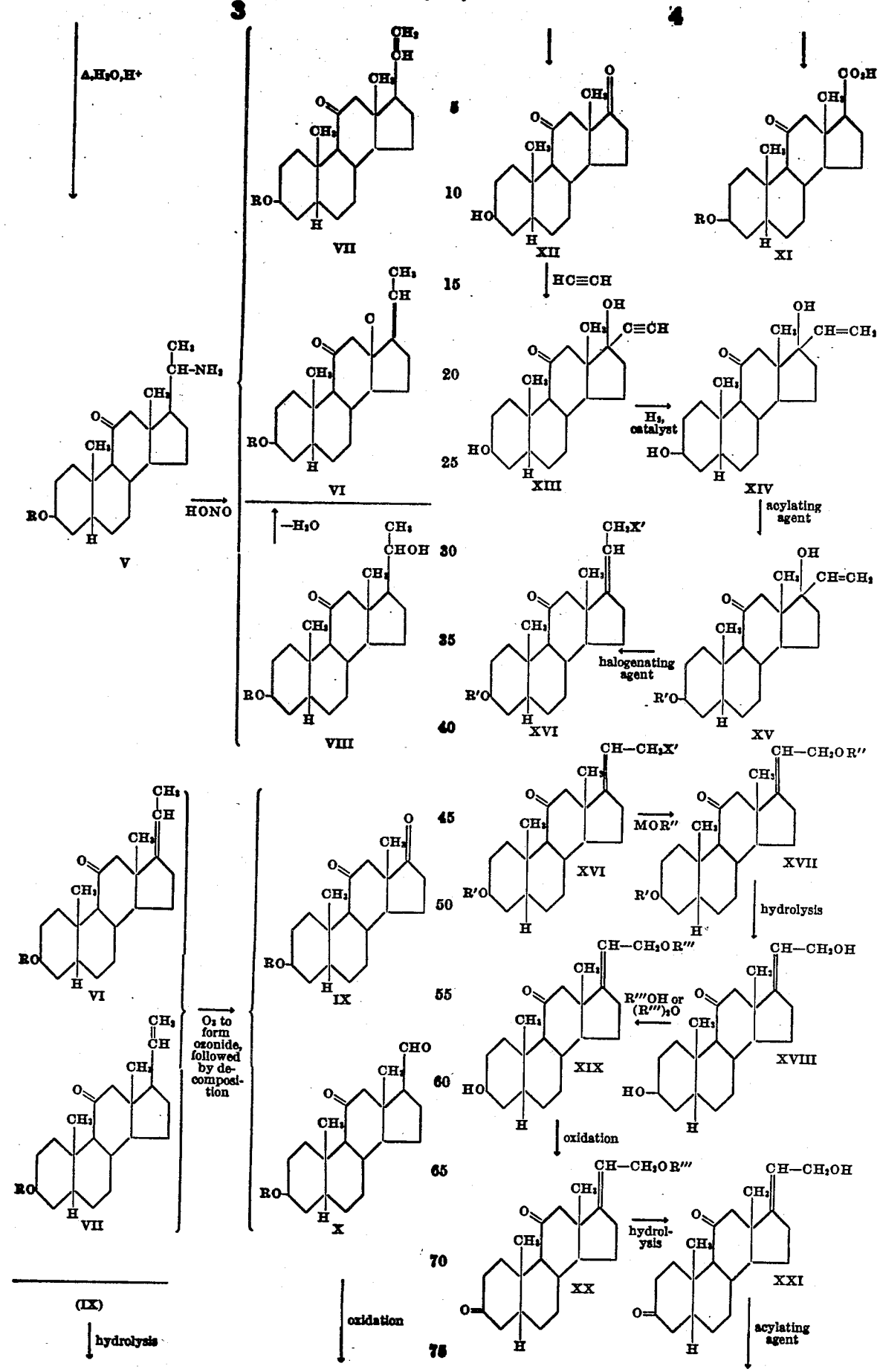

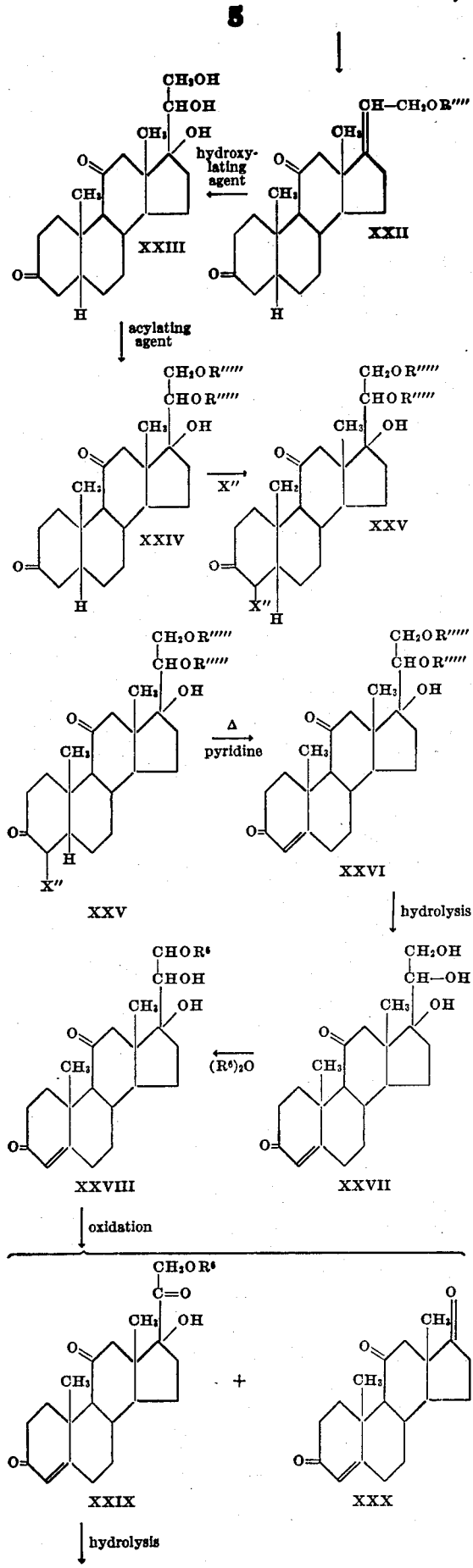
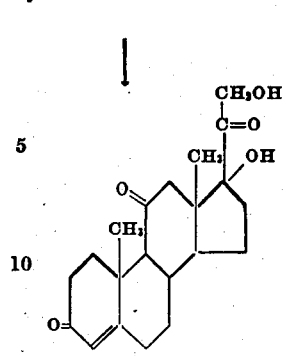

In the above formulae, R, R', R'', R''', R'''', R''''', and R⁶ are acyl; X, X' and X'' are halogen; and M is an alkali metal or an alkaline earth metal /2.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (IX) which is separated from compound (IX) by extraction with alkali.

Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy-11-ketopregnene (XIV) which is acylated to form $\Delta^{20,21}$-3-acyloxy-17-hydroxy-11-ketopregnene (XV), and this compound is halogenated to produce $\Delta^{17,20}$-3-acyloxy-11-keto-21-halopregnene (XVI). When treated with an alkali metal salt or alkaline earth metal salt of an organic acid, this compound yields $\Delta^{17,20}$-3,21-diacyloxy-11-ketopregnene (XVII) which is hydrolyzed producing $\Delta^{17,20}$-3,21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester of $\Delta^{17,20}$-3,11-diketo-21-acyloxy-pregnene (XX). This product (XX) is hydrolyzed and the $\Delta^{17,20}$-3,11-diketo-21-hydroxypregnene (XXI) thus formed is acylated producing $\Delta^{17,20}$-3,11-diketo-21-acyloxypregnene (XXII). Hydroxylation at the unsaturation of the last mentioned compound (XXII) results in the production of 3,11-diketo-17(β),20,21-trihydroxypregnene (XXIII) which is then acylated to form 3,11-diketo-17(β)-hydroxy-20,21-diacyloxypregnene (XXIV). When brominated, this compound yields 3,11-diketo-4-bromo-17(β)-hydroxy-20,21-diacyloxypregnene (XXV).

This compound is then treated with a reagent capable of removing the elements of hydrogen bromide, thereby producing $\Delta^{4,5}$-3,11-diketo-17(β)-hydroxy-20,21-diacyloxypregnene (XXVI) which on hydrolysis forms $\Delta^{4,5}$-3,11-diketo-17(β),20,21-trihydroxypregnene (XXVII). Partial acylation of this compound (XXVII) gives $\Delta^{4,5}$-3,11-diketo-17(β),20-dihydroxy-21-acyloxypregnene (XXVIII) which, when oxidized, yields a mixture of $\Delta^{4,5}$-3,11,20-triketo-17(β)-hydroxy-21-acyloxypregnene (XXIX) and $\Delta^{4,5}$-3,11,17-triketo androstene (XXX). Compounds (XXIX) and (XXX) may be separated by conventional operations, for example chromatography, and compound (XXIX) hydrolyzed to produce the desired adrenal hormone, $\Delta^{4,5}$-3,11,20-triketo-17(β),21-dihydroxypregnene.

This invention is concerned with compounds of the type represented by intermediate 16 above, and with processes of producing same, which intermediate is represented by the formula

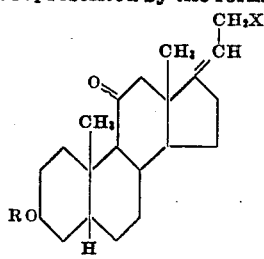

in which R is acyl or hydrogen and X is halogen.

The starting material employed in the process according to this invention, a $\Delta^{20,21}$-3-acyloxy-11-keto-17-hydroxypregnene, may be obtained as described in copending application Serial No. 649,762, filed February 23, 1946.

In accordance with this invention, $\Delta^{20,21}$-3-acyloxy-17-hydroxy-11-ketopregnene is halogenated in the presence of a small amount of halogenation catalyst such as pyridine and in an inert solvent medium such as chloroform, to produce the corresponding $\Delta^{17,20}$-3-acyloxy-11-keto-21-halopregnene. As halogenating agents, phosphorous tribromide, phosphorous trichloride, thionyl chloride may be used. It is found that the 17 hydroxyl group is thus replaced by a halogen atom and that the unsaturated system undergoes an allylic shift, yielding a product having the structural formula:

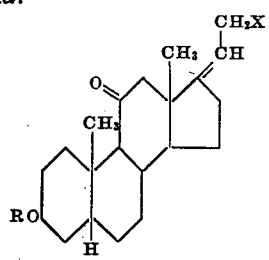

in which R acyl (preferably a lower aliphatic acyl group having 6 or less carbon atoms), and X is halogen. The acyl radical in the 3 position may be converted to hydroxyl by saponification and, of course, this compound may be esterified with an acid such as acetic, propionic, butyric, valeric, caproic, capric, etc., benzoic, toluic, or phenyl-acetic, an acid anhydride or other acylating agent. The preferred acylating agents are the lower aliphatic acid anhydrides, i. e. those of acids having 6 carbons or less, of which acetic anhydride is preferred.

The following example, which is illustrative of the practice of this invention, discloses the detailed process for the bromination of $\Delta^{20,21}$-3(α) acetoxy-17(α) hydroxy-11-ketopregnene; it will be understood the invention is not limited to this particular procedure or to treatment of this specific compound or use of the indicated halogenating reagent.

*Example*

To a solution of 120 mg. phosphorous tribromide in .74 cc. of absolute chloroform at —60° C. is added dropwise a solution of 400 mg. of $\Delta^{20,21}$-3(α)-acetoxy-17(α)-hydroxy-11-ketopregnene in 5.8 cc. of absolute chloroform. Two drops of pyridine were added and the mixture was permitted to stand at room temperature overnight. A solution of sodium bicarbonate was added and the mixture concentrated in vacuo. The resultant gum was dissolved in ether, washed with water, concentrated in vacuo and the residue crystallized first from petroleum ether and then from ether-methanol. The $\Delta^{17,20}$-3(α)-acetoxy-11-keto-21 bromopregnene thus recovered in about 50% yield had a melting point of 116° to 117°, and upon saponification yielded $\Delta^{17,20}$-3(α)-hydroxy-11-keto-21-bromopregnene.

While in the example the starting material used was a compound having the 3-acetoxy group in the trans form, a compound having this group in the cis form also may be used as the steric configuration of the group in the 3 position is not important.

The temperatures mentioned in the example are room temperatures unless otherwise indicated. The temperatures, however, are not critical and the reactions may be carried out at higher or lower temperatures; but extremely high temperatures should be avoided because of the likelihood of decomposition of the desired products which may result from operation at such temperatures.

Unless otherwise stated, the reagents can be used in different proportions than are indicated in the above example as the proportions unless otherwise indicated, are not critical, although enough of the reagents should be employed to insure substantially complete reaction to produce the desired products.

All melting points in this specification are corrected.

Since certain changes in carrying out the above process, and certain modifications in the intermediates which embody the invention may be made without departing from the scope of the invention, it is intended that all matter contained in the above description shall be interpreted in an illustrative and not in a limiting sense.

What is claimed is:

1. A compound of the formula:

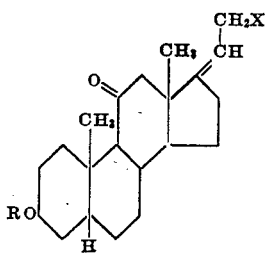

wherein R is a member of the group consisting of acetyl and hydrogen and X is a bromine.

2. $\Delta^{17,20}$ - 3 - acetoxy - 11 - keto - 21 - bromopregnene.

3. $\Delta^{17,20}$ - 3 - hydroxy - 11 - keto - 21 - bromopregnene.

LEWIS H. SARETT.

REFERENCES CITED

The following references are of record in the file of this patent:

UNITED STATES PATENTS

| Number | Name | Date |
|---|---|---|
| 2,266,778 | Logemann | Dec. 23, 1941 |
| 2,305,727 | Miescher et al. | Dec. 22, 1942 |